(12) United States Patent  
Fu

(10) Patent No.: US 11,982,308 B2  
(45) Date of Patent: May 14, 2024

(54) DEVICE FOR FIXING EQUIPMENT TO AN END OF THE INNER SURFACE OF A TUBE

(71) Applicant: BikeFinder AS, Stavanger (NO)

(72) Inventor: Youhua Fu, Sola (NO)

(73) Assignee: BikeFinder AS, Stavanger (NO)

( * ) Notice: Subject to any disclaimer, the term of this patent is extended or adjusted under 35 U.S.C. 154(b) by 279 days.

(21) Appl. No.: 17/609,464

(22) PCT Filed: Jul. 7, 2020

(86) PCT No.: PCT/NO2020/050192  
§ 371 (c)(1),  
(2) Date: Nov. 8, 2021

(87) PCT Pub. No.: WO2021/006746  
PCT Pub. Date: Jan. 14, 2021

(65) Prior Publication Data  
US 2022/0170589 A1    Jun. 2, 2022

(30) Foreign Application Priority Data

Jul. 8, 2019    (NO) .................................. 20190858

(51) Int. Cl.  
*F16B 7/02*    (2006.01)
(52) U.S. Cl.  
CPC ........ *F16B 7/025* (2013.01); *F16B 2200/406* (2018.08)
(58) Field of Classification Search  
CPC .......... B62J 45/422; B62K 21/26; B66C 1/54; B66C 1/56; F16B 2/04; F16B 2/18;  
(Continued)

(56) References Cited

U.S. PATENT DOCUMENTS 2,192,484 A    3/1940    Bryan  
3,075,800 A  *  1/1963    Rowekamp ............. B65B 21/12  
294/90

(Continued)

FOREIGN PATENT DOCUMENTS

CN    204921580    12/2015  
CN    107265293    10/2017  
(Continued)

OTHER PUBLICATIONS

International Search Report for PCT/NO2020/050192, dated Sep. 15, 2020.  
Norwegian Search Report for NO 20190858, dated Jan. 7, 2020.

*Primary Examiner* — Josh Skroupa  
(74) *Attorney, Agent, or Firm* — Andrus Intellectual Property Law, LLP

(57) ABSTRACT

A device is for fixing equipment to an end of the inner surface of a tube. The device has an elongated body, a ring adapted to surround and slide along a segment of the elongated body, and at least two flaps rotatable on the ring. Each hole in the elongated body is adapted for bearing a bolt aligned with the longitude of the elongated body. The ring has at least two threaded bores designed to mate with the threads of the bolts so that the position of the ring on the elongated body is controllable by applying torque to the bolts; and the flaps are positioned homogenously around the ring. The elongated body has at least one portion adapted to guide the flaps so that the flaps radially open against the inner surface of the tube.

10 Claims, 5 Drawing Sheets

(58) Field of Classification Search
CPC ........ F16B 7/025; F16B 7/0413; F16B 7/042; F16B 7/0466; F16B 7/0473; F16B 7/149; F16B 7/18; F16B 7/182; F16B 21/10; F16B 21/20; F16B 2200/406; Y10T 403/608; Y10T 403/7064; Y10T 403/7066; Y10T 403/7067; Y10T 403/7069
USPC ............ 403/330, 374.1, 374.2, 374.3, 374.4
See application file for complete search history.

(56) References Cited

U.S. PATENT DOCUMENTS

| | | | | |
|---|---|---|---|---|
| 3,314,699 | A * | 4/1967 | Taylor | F16B 7/0446 403/14 |
| 4,556,337 | A * | 12/1985 | Marshall | F16B 7/0473 403/255 |
| 4,623,954 | A | 11/1986 | Schott et al. | |
| 4,805,260 | A * | 2/1989 | Tooth | F16B 7/025 411/908 |
| 5,897,268 | A * | 4/1999 | Deville | F16B 7/1463 403/374.4 |
| 8,297,870 | B2 * | 10/2012 | Lenhart | F16B 7/1463 403/374.4 |
| 9,480,314 | B2 * | 11/2016 | Heim | F16B 7/1463 |
| 9,488,203 | B2 * | 11/2016 | Sekretta | F16B 7/042 |
| 9,656,716 | B2 * | 5/2017 | DeGray | B62K 19/32 |
| 2005/0248156 | A1 * | 11/2005 | Hsieh | F16B 7/025 403/300 |
| 2006/0032326 | A1 | 2/2006 | Griswold | |
| 2018/0057093 | A1 | 3/2018 | Lenig | |

FOREIGN PATENT DOCUMENTS

| | | | | |
|---|---|---|---|---|
| DE | 102010026125 A1 * | 7/2011 | ........... | B23B 29/046 |
| DE | 202014100893 U1 * | 4/2014 | ............. | F16B 12/20 |
| EP | 1435323 | 7/2004 | | |
| EP | 1808367 | 7/2007 | | |
| EP | 2275338 | 1/2011 | | |
| NO | 341947 | 2/2018 | | |
| WO | 2018061652 | 4/2018 | | |

* cited by examiner

DEVICE FOR FIXING EQUIPMENT TO AN END OF THE INNER SURFACE OF A TUBE

CROSS-REFERENCE TO RELATED APPLICATIONS

This application is the U.S. national stage application of International Application PCT/NO2020/050192, filed Jul. 7, 2020, which international application was published on Jan. 14, 2021, as International Publication WO 2021/006746 in the English language. The International Application claims priority of Norwegian Patent Application No. 20190858, filed Jul. 8, 2019. The international application and Norwegian application are both incorporated herein by reference, in entirety.

FIELD

The present invention relates to a device for fixing equipment to an end of the inner surface of a tube.

BACKGROUND

The interior of a tube is a useful location to install equipment in many situations. When a tube is used as a supporting component, such as a handlebar or a seat post in a bicycle, the inner space of the tube can be used for housing a GPS tracker or an alarm device (eg. NO 341947 B1). And when the tube is used as a conduit, such as a tail pipe in an exhaust system of a car or a duct in a ventilation system, the inner space of the tube can be used for housing a sensor to measure toxin levels, the temperature or any other parameter about the fluid passing through the conduit.

It has been noticed that the ends of the inner surface of a tube are desirable locations for installing equipment inside the tube, because it is sufficiently easy for most users to do this type of installation. In most cases, the installation process requires inserting the equipment into the tube until the latter no longer protrudes from the tube. Thus, the installation process is simple and accessible to most users. For example, a bicycle owner may buy a tracking unit (eg. NO 341947 B1) online and install it himself inside the handlebar of the bicycle, instead of having to take the bicycle to a specialised shop for the installation.

It can be challenging to keep the equipment fixed to an end of the inner surface of a tube.

A known approach is the one used in a typical end plug for a bicycle handlebar. This type of plug has several purposes: to close the inner volume of the handlebar and avoid dirt or water from entering in; to help stop the ends of the handlebars from impact or crush damage in the event of a crash; and to prevent serious injury to a user from an exposed bar end coming into contact with soft tissue. A typical end plug is attached to a handlebar by pushing it in until it reaches the desired position. The plug includes at least one bendable component around its central axis, such as an annular plastic flap, that remains compressed against the inner surface of the handlebar, and thus keeps it in place. A disadvantage of this approach is that an installed end plug does not require much force to be removed from the handlebar. Also, it is known that many end plugs must be replaced after some time due to the bendable components no longer being effective in compressing against the inner surface of the handlebar.

Another known approach is the one used in the oil industry to install a packer during the completion of a wellbore. A typical packer includes an expandable component, such as a rubber annular ring, that expands radially towards the surrounding surface (for example, the inner surface of a casing string). A typical solution to cause this radial expansion is to keep the expandable component compressed in the longitudinal axis. Once radially expanded, the component contacts the surrounding surface and forms a seal that blocks the passage of fluids from one side of the seal to the other within the annular formed between the packer and the surrounding surface. This approach has the drawback that it can only be used for installing a device in a tube in which no fluid is expected to pass through. Also, if a device installed using this approach is pulled from the tube, its expandable component may be swabbed off (ie. removed from the device due to the dislocation caused by the pulling motion), and thus this approach does not provide a suitable solution to keep equipment fixed to an end of the inner surface of a tube.

SUMMARY

The present invention will now be disclosed.

According to a first aspect of the present invention, there is provided a device for fixing equipment to an end of the inner surface of a tube, the device comprising:
- an elongated body comprising at least two holes, each hole being adapted for bearing a bolt aligned with the longitude of the elongated body;
- a ring adapted to surround and slide along a segment of the elongated body, the ring comprising at least two threaded bores designed to mate with the threads of the bolts so that the position of the ring on the elongated body is controllable by applying torque to the bolts; and
- at least two flaps rotatable on the ring, the flaps being positioned homogenously around the ring,
- wherein the elongated body comprises at least one portion adapted to guide the flaps so that the flaps radially open against the inner surface of the tube.

Each portion of the elongated body may comprise a slope to guide at least one flap outwardly towards the inner surface of the tube. Also, each flap may comprise an end adapted with a shape for sliding on a portion of the elongated body.

The ring may be adapted with at least one stopper 126, each stopper 126 limiting the rotation of a flap to a maximum of 95 degrees relative to the longitudinal axis of the elongated body. Also, each flap may comprise a retractable mechanism so that the flap automatically rotates to the minimum angle available relative to the longitudinal axis of the elongated body. Also, the device may comprise four flaps.

The segment of the elongated body may comprise a groove for controlling the rotation of the ring during the sliding motion along the segment of the elongated body. Also, the ring may comprise an internal bulge to match the groove on the segment of the elongated body complementarily.

The device may comprise a hole through the elongated body so that the ends of hole are electronically connectable.

Each of the elongated body, the ring, and the at least two flaps may comprise a metallic material. This achieves a stronger fixation when to the inner surface of the tube.

BRIEF DESCRIPTION OF THE DRAWINGS

Embodiments of the invention will now be described, by way of example only, with reference to the accompanying drawings, in which.

DETAILED DESCRIPTION OF THE DRAWINGS

Figure 1:
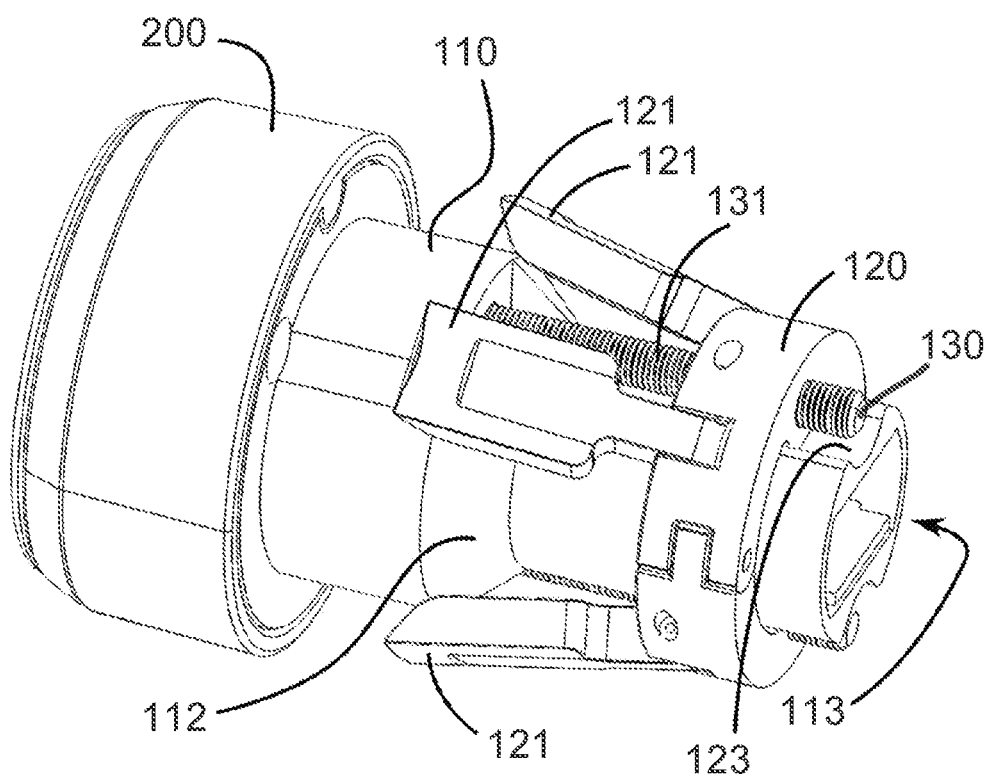
FIG. 1 is a perspective view of a device embodiment being shown outside of any tube.

Turning now to FIG. 1, it shows a device embodiment being displayed outside of any tube. The device is to be placed inside a tube, such as a handlebar in a bicycle or a tail pipe of an exhaust system in a car.

The device includes an elongated body 110 serving as a base onto which other components are attached and a ring 120 for surrounding and sliding on a segment of the elongated body 110. Also, the ring includes four flaps 121 for radially opening against an inner surface of a tube.

The elongated body 110 includes two holes for bearing two bolts 130 aligned with the longitude of the elongated body 110. Also, the ring 120 includes two threaded bores designed to mate with the threads of bolt shafts 131 of the bolts 130. This allows controlling the position of the ring 120 on the elongated body 110 by applying torque to the bolts 130. When the bolts 130 are tightened, the ring 120 moves towards the holes for bearing the bolts 130. Contrarily, when the bolts 130 are released, the ring 120 moves away from the holes bearing the bolts 130.

This mechanism allows moving the ring 120 between two positions: an unfastened position, in which the ring 120 is away from the holes bearing the bolts 130; and a fastened position, in which the ring 120 is close to those holes and the flaps 121 are tightened against the body a portion 112 of the elongated body 110.

The four flaps 121 included in the device are rotatable on the ring 120. These rotatable components are used for griping against an inner surface of a tube when the ring 120 is in the fastened position. This is achieved as follows.

The flaps 121 are positioned homogenously around the ring 120 so that when they are radially opened they produce a balanced force against the surrounding inner surface of the tube. The elongated body 110 includes a portion 112 in the form of a slope for guiding the flaps 121 to radially open against the inner surface of the tube when the ring 120 is in the fastened position. When the bolts 121 are tightened, the ring 120 slides on the elongated body 110 towards the portion 112 of the elongated body 110. In other words, the flaps 121 move towards the portion 112 of the elongated body 110. After sufficient tightening of the bolts 130, the flaps 121 contact the portion 112 and start sliding on it. Given the slope of the portion 112, the ability of the flaps 121 to rotate on the ring 120, and the further tightening of the bolts 130, the flaps will start to radially open until they eventually grip against the inner surface of a tube surrounding the device.

The gripping of the flaps 121 against the inner surface of the tube results in that the elongated body 110 gets fixed to the tube. In practice, it has been observed that this solution is strong and very difficult to remove by most users without tools. This solution thus allows attaching further equipment onto the elongated body 110, and device can be used for fixing the equipment to the end of the inner surface of a tube. As explained in the beginning of the description, this has been noticed to be a desirable location for installing equipment inside the tube.

The segment of the elongated body 110 on which the ring 120 slides includes a groove 123 which is complementary in shape to an internal bulge in the ring 120. These features are explained in further detail below when describing FIGS. 3A and 3B.

Moreover, the elongated body 110 includes a hole 113 through it that allows providing electrical connections between the two ends of hole 113. This thus creates an efficient use of the space that is occupied by the device inside a tube. In the device embodiment shown in FIG. 1, an antenna housing 200 is provided on the opposite end of the hole 113 through the elongated body 110, and this device embodiment allows providing equipment that can communicated with any antenna through the hole 113. Such an arrangement is explained in further detail below when describing FIG. 4.

Figure 2A:
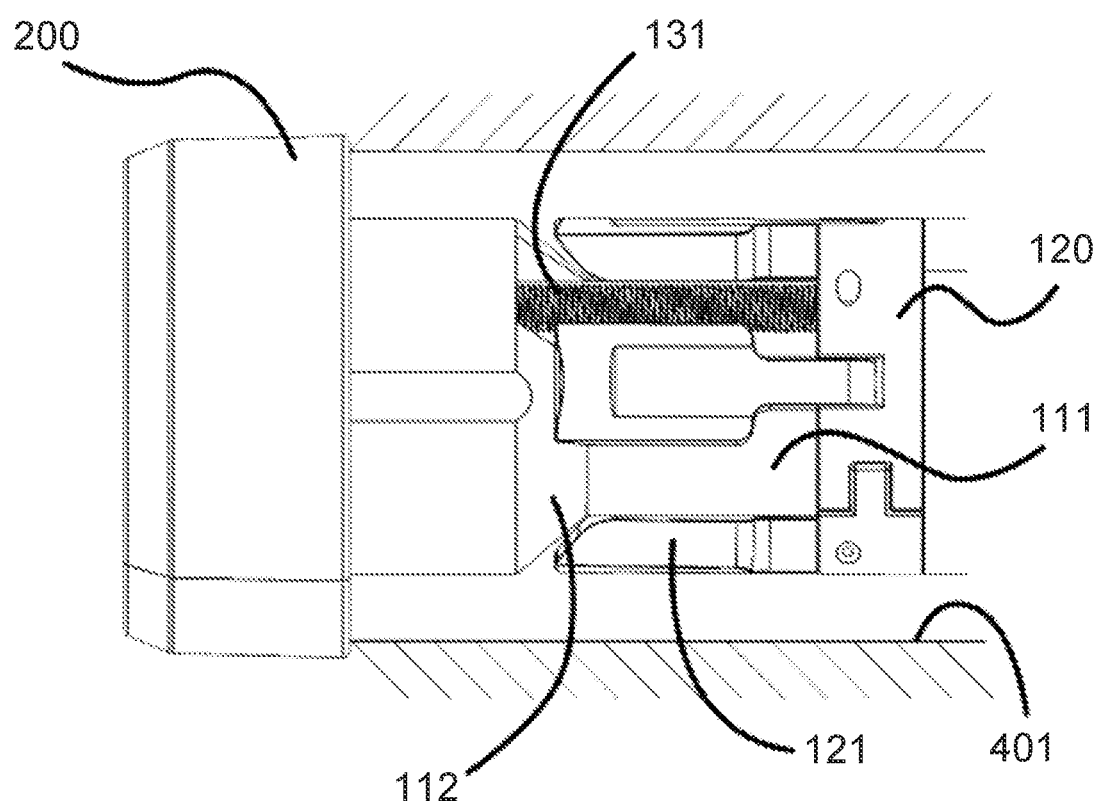
FIG. 2A is a cross-sectional longitudinal view of the embodiment in FIG. 1, in which the flaps are radially closed and away from the inner surface of a tube.

FIG. 2A shows the embodiment in FIG. 1 positioned inside the end of a handlebar. The ring 120 is in the unfastened position and the flaps 121 are not radially opened against the inner surface 401 of the handlebar.

For the purposes of a simpler visualisation, the flaps 121 are illustrated in a retracted position. This can be achieved with the use of springs or a similar mechanism inside the ring 120. It can also be achieved by placing an elastic band around the flaps 121, the band being made of a stretchable material such as rubber. This latter embodiment including the elastic band is particularly advantageous in that it achieves an improved friction against the inner surface 401 of the tube. Alternatively, the device may lack any means of retracting the flaps 121 when the ring 120 is not in the fastened position, and in that case the flaps 121 will behave in reaction to gravity. This latter embodiment still allows the device to inserted into and removed from the interior of the handlebar and is simple to produce.

The device has been fully inserted into the handlebar and the antenna housing 200 is shown on the left-hand side of FIG. 2A on the outside of the handlebar. This arrangement achieves an overall aspect when installed that resembles an end plug for a bicycle handlebar. It also allows for the antenna housing 200 to be used efficiently for the purpose of holding communication features, such as a GPS antenna.

Figure 2B:
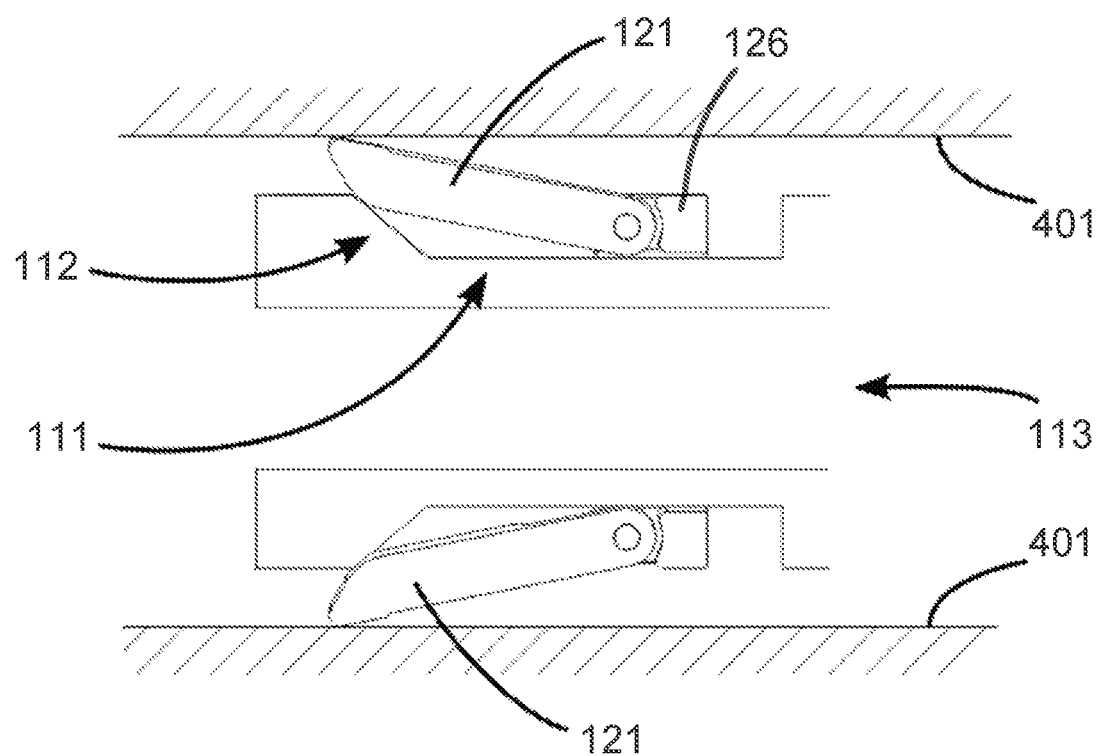
FIG. 2B is a cross-sectional longitudinal view of a simplified schematic of the embodiment in FIG. 1, in which the flaps are radially open against the inner surface of a tube.

FIG. 2B shows a simplified schematic of the embodiment in FIG. 1, in which the flaps are radially open against the inner surface of a tube. No antenna housing is shown, and the elongated body has been cut to show mainly the flaps 121 radially opened against the inner surface 401 of the tube. The segment 111 on which the ring 121 slides is indicated in the FIG. 2B. Also indicated, is the portion 112 of the elongated body 110 including a slope.

Also, the cut view shown in FIG. 2B allows seeing the hole 113 through the elongated body and its full extension along the longitude of the elongated body 110.

Figure 3A:
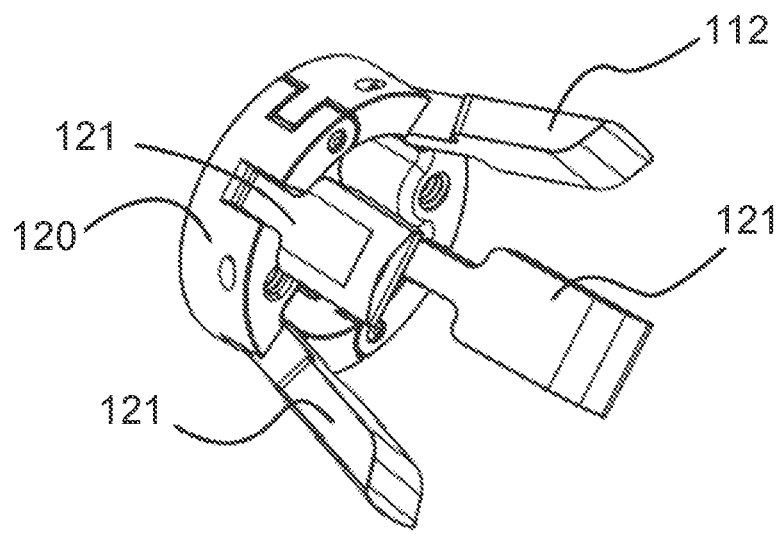
FIG. 3A is a perspective view of a ring embodiment including four flaps.

FIG. 3A shows a ring 120 embodiment including four flaps 121 positioned homogenously around the ring 120. The two threaded bores for receiving the bolts 130 are positioned in an intercalated manner with the arrangement of flaps 121. This achieves an efficient use of the reduced space available in the ring 120.

Figure 3B:
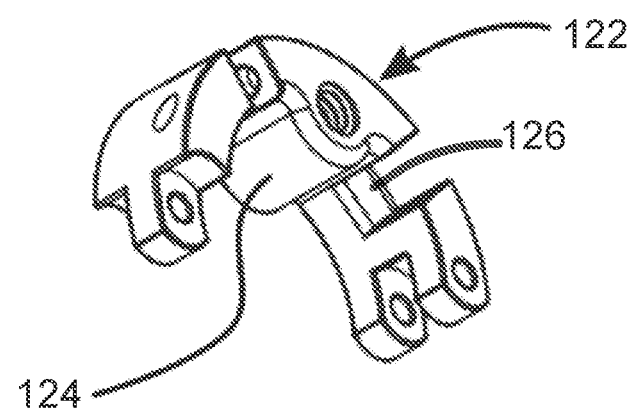
FIG. 3B is a perspective view of a half ring embodiment.

FIG. 3B shows a half ring embodiment without any flaps 121, the half ring illustration showing in more detail where a threaded bore 122 is positioned. The half ring includes an internal bulge 124, which has already been briefly mentioned when describing FIG. 1 above. The internal bulge 124 is shaped in a complementary manner to a groove 123 that is to exist in a portion 112 of the elongated body 110. This allows controlling the orientation of the ring 120 while it slides on the portion 112. For example, a straight groove 123 may be provided longitudinally along the elongated body 110 so that the ring 120 keeps a stable orientation and does spin while it slides on the segment of the elongated body 110. This thus allows using a reduced number of bolts 130. Further embodiments of the device may be carried out in which no groove 123 nor internal bulge 124 is provided, however the device includes a higher number of bolts 130, such as at least four bolts 130.

The half ring embodiment shown in FIG. 3B also includes symmetrically mirrored joints at its ends. This design allows manufacturing, installing and removing rings 120 around the elongated body 110 in an efficient manner, as a reduced amount of parts is needed. This embodiment thus achieves advantageous effects also on during the production as well as on the maintenance/repair of the device.

Figure 4:
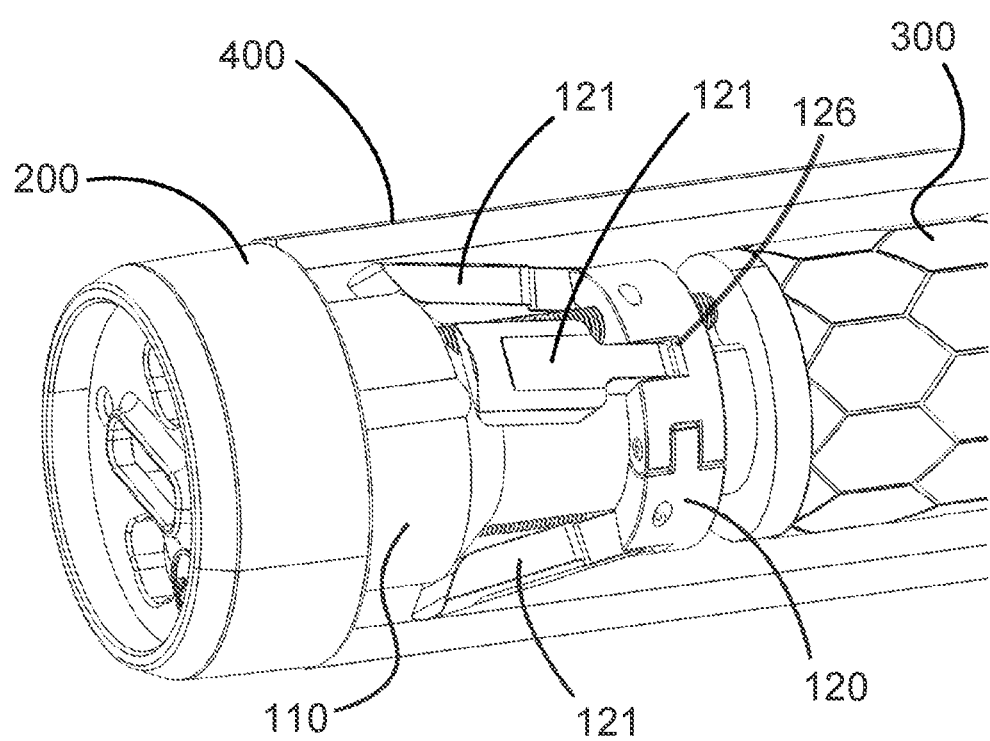
FIG. 4 is a cut-away view of a device embodiment installed inside a handlebar in a bicycle, in which part of the handlebar has been removed to show the device inside.

FIG. 4 shows a device embodiment installed on the end of a handlebar 400 in a bicycle. For the purpose of providing a simplified visualisation, part of the handlebar 400 has been removed so that the device may be observed inside. The ring 120 is in the fastened position and the flaps 121 are radially opened against the inner surface of the handlebar 400. Also, the elongated body 110 has the antenna housing 200 attached to the side that faces the end of the handlebar 400 and an equipment housing 300 attached to the opposite side, the equipment housing 300 thus being hidden inside the handlebar 400.

The device embodiment shown in FIG. 4 allows strongly fixing the equipment housing 300 to the end of inner surface of the handlebar 400 while enabling electronic connection to the antenna housing 200 positioned on the outside of the handlebar 400. The electronic connection is achieved through the core of the elongated body 110 of the device embodiment.

REFERENCE NUMBERS

100 device
110 elongated body
111 segment
112 portion
113 hole through elongated body
120 ring
121 flap
122 threaded bore
123 groove
124 bulge
125 half ring
130 bolt
131 bolt shaft
200 antenna housing
300 equipment housing
400 handlebar
401 inner surface of the handlebar

The invention claimed is:

1. A device for fixing equipment to an end of the inner surface of a tube via at least two bolts, the device comprising:
    an elongated body comprising at least two holes adapted for bearing the at least two bolts aligned with the longitude of the elongated body, respectively;
    a ring adapted to surround and slide along a segment of the elongated body, the ring comprising at least two threaded bores designed to mate with the threads of the bolts so that the position of the ring on the elongated body is controllable by applying torque to the bolts; and
    at least two flaps rotatable on the ring, the flaps being positioned homogenously around the ring,
    wherein the elongated body comprises at least one portion adapted to guide the flaps so that the flaps radially open against the inner surface of the tube.

2. The device according to claim 1, wherein the at least one portion of the elongated body comprises a slope to guide the flaps outwardly towards the inner surface of the tube.

3. The device according to claim 1, wherein each flap comprises an end adapted with a shape for sliding on a portion of the elongated body.

4. The device according to claim 1, wherein the ring is adapted with at least one stopper, each stopper limiting the rotation of a flap to a maximum of 95 degrees relative to the longitudinal axis of the elongated body.

5. The device according to claim 1, wherein each flap is retractable via rotation to reduce an angle relative to the longitudinal axis of the elongated body.

6. The device according to claim 1, the device comprising four flaps.

7. The device according to claim 1, wherein the segment of the elongated body comprises a groove for controlling the rotation of the ring during the sliding motion along the segment of the elongated body.

8. The device according to claim 7, wherein the ring comprises an internal bulge to match the groove on the segment of the elongated body complementarily.

9. The device according to claim 1, the device comprising a hole through the elongated body so that the ends of the hole are electronically connectable.

10. The device according to claim 1, wherein each of the elongated body, the ring, and the at least two flaps comprises a metallic material.

* * * * *